(12) United States Patent
Dong

(10) Patent No.: US 8,625,936 B1
(45) Date of Patent: Jan. 7, 2014

(54) ADVANCED MODULATION FORMATS USING OPTICAL MODULATORS

(75) Inventor: Po Dong, Morganville, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/538,525

(22) Filed: Jun. 29, 2012

(51) Int. Cl.
- *G02F 1/035* (2006.01)
- *G02B 6/26* (2006.01)
- *G02B 6/42* (2006.01)
- G02B 26/00 (2006.01)
- G02F 1/00 (2006.01)
- G02F 1/03 (2006.01)
- G02F 1/07 (2006.01)

(52) U.S. Cl.
USPC ...... 385/3; 385/1; 385/32; 359/237; 359/244; 359/279

(58) Field of Classification Search
USPC .......................................................... 385/32
See application file for complete search history.

(56) References Cited

U.S. PATENT DOCUMENTS

| | | | |
|---|---|---|---|
| 6,549,319 B2 | 4/2003 | Mahlab | |
| 6,633,696 B1* | 10/2003 | Vahala et al. | 385/27 |
| 6,778,318 B2 | 8/2004 | Sayyah et al. | |
| 6,807,338 B2 | 10/2004 | Bouteiller et al. | |
| 7,006,726 B2* | 2/2006 | Hayes | 385/27 |
| 7,057,250 B2* | 6/2006 | Kolodzey et al. | 257/428 |
| 7,110,632 B2* | 9/2006 | Abeles | 385/15 |
| 7,174,064 B2* | 2/2007 | Sayyah et al. | 385/15 |
| 7,292,791 B2 | 11/2007 | Sayyah et al. | |
| 7,558,487 B2 | 7/2009 | Liu et al. | |
| 7,657,129 B2* | 2/2010 | Karras | 385/1 |
| 7,729,576 B2 | 6/2010 | Kornilovich et al. | |
| 8,027,587 B1 | 9/2011 | Watts | |
| 8,032,027 B2 | 10/2011 | Popovic | |
| 2001/0004411 A1* | 6/2001 | Yariv | 385/28 |
| 2004/0228564 A1 | 11/2004 | Gunn, III et al. | |
| 2004/0228638 A1 | 11/2004 | Sayyah et al. | |
| 2005/0111789 A1* | 5/2005 | Hayes | 385/27 |
| 2006/0008272 A1* | 1/2006 | Abeles | 398/48 |
| 2006/0215949 A1* | 9/2006 | Lipson et al. | 385/2 |
| 2007/0223859 A1* | 9/2007 | Kornilovich et al. | 385/15 |
| 2009/0060409 A1* | 3/2009 | Karras | 385/2 |
| 2009/0103863 A1* | 4/2009 | Lee et al. | 385/31 |
| 2009/0161113 A1* | 6/2009 | Chen et al. | 356/477 |
| 2009/0220228 A1 | 9/2009 | Popovic | |
| 2010/0266233 A1* | 10/2010 | Morris et al. | 385/2 |
| 2011/0063710 A1 | 3/2011 | Chao et al. | |
| 2012/0057866 A1* | 3/2012 | McLaren et al. | 398/25 |
| 2012/0105177 A1* | 5/2012 | McLaren et al. | 333/234 |

FOREIGN PATENT DOCUMENTS

| WO | 2005067031 A1 | 7/2005 |
|---|---|---|
| WO | 2005106551 A | 11/2005 |

OTHER PUBLICATIONS

Zhang, Lin, et al., "Silicon Microring-Resonator-Based Modulation and Demodulation of DQPSK Signals", 2008 IEEE, 3 pages.
Dong, Po, et al., "Experimental demonstration of microring quadrature phase-shift keying modulators", Optics Letters, vol. 37, No. 7, Apr. 1, 2012, pp. 1178-1180.
Heebner, John E., "Enhanced Linear and NonLinear Optical Phase Response of Microring Resonators for Engineerable Photonic Media", 2004, The Institute of Optics, SPIE 2004, 21 pages.
Dong, Po, et al. "Wavelength-tunable silicon microring modulator." Opt. Express 18.11 (2010): 10941-10946.
Lu, Yuanyuan, et al. "All-optical format conversions from NRZ to BPSK and QPSK based on nonlinear responses in silicon microring resonators." Opt. Express 15 (2007): 14275-14282.

* cited by examiner

*Primary Examiner* — Rhonda Peace
(74) *Attorney, Agent, or Firm* — Hitt Gaines, PC (57) ABSTRACT

A system, e.g. an optical modulator, includes an optical waveguide and a plurality of optical resonators. The optical waveguide is located along a surface of a planar substrate. The plurality of optical resonators is also located along the surface and coupled to the optical waveguide. Each of said optical resonators is configured to resonantly couple to the optical waveguide at a different optical frequency.

20 Claims, 11 Drawing Sheets

ADVANCED MODULATION FORMATS USING OPTICAL MODULATORS

TECHNICAL FIELD

This application is directed, in general, to optical communications systems and methods.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Optical modulators often use one or more Mach-Zehnder interferometers. These devices typically include electro-optic modulators. Such modulators have been implemented in various optical media, including silicon, compound semiconductors, and LiNbO$_3$. While these devices are capable of high-speed performance, they can also consume significant power, e.g. for heating or electrically polarizing waveguide segments to modulate the refractive index of the segments. When integrated into an optical system, a significant portion of the power consumption of the system may result from the optical modulators.

SUMMARY

One aspect provides a system, e.g. an optical modulator. The system includes an optical waveguide and a plurality of optical resonators. The optical waveguide is located along a surface of a planar substrate. The plurality of optical resonators is also located along the surface and is coupled to the optical waveguide. Each of the optical resonators is configured to resonantly couple to the optical waveguide at a different optical frequency.

Another aspect provides a method, e.g. for manufacturing an optical system, e.g. a modulator. The method includes forming an optical waveguide and a plurality of optical resonators along a surface of a substrate. The forming is performed such that each of the resonators is adjacent to segments of and optically coupled to the optical waveguide. Each of the resonators is configured to resonate at a different optical frequency.

Some of the above-described embodiments include a second optical waveguide and a second plurality of optical resonators optically coupled to the second optical waveguide. Each optical resonator of the second plurality is configured to resonantly couple to the second optical waveguide at about a same optical frequency as a corresponding one of the optical resonators of the first plurality. In some such embodiments the first optical waveguide may end-connect a first output of an optical power splitter to a first input of an optical power combiner and the second optical waveguide may end-connect a second output of the optical power splitter to a second input of an optical power combiner. In some such embodiments the first and second optical waveguides and the optical resonators are configured to QPSK optically modulate optical carriers at a sequence of wavelengths.

In any of the above-described embodiments some of the optical resonators may be overcoupled to their associated optical waveguide. In any embodiment the optical core regions of the optical waveguide and the resonators may be formed in silicon located over a dielectric layer. Any embodiment may include an optical source configured to output the optical signal such that the optical signal includes frequency components corresponding to resonant frequencies of the optical resonators. In any embodiment, each optical resonator may include a first optical phase modulator configured to enable quasi-static optical path adjustments thereto and a second optical phase modulator configured to enable optical path adjustments at a frequency of at least about 1 GHz.

BRIEF DESCRIPTION

Reference is now made to the following descriptions taken in conjunction with the accompanying drawings, in which:

FIGS. 1-9.

DETAILED DESCRIPTION

The inventor has determined that some limitations of conventional modulators may be overcome by using a plurality of controllable optical microcavity resonators, e.g. ring resonators, optically coupled to a waveguide to modulate the phase of an optical carrier signal at each of a plurality of wavelengths. Such an assembly may form the basis of a compact and low power optical modulator that can provide QPSK (quadrature phase-shift keyed) modulation of a plurality of channels in a WDM (wavelength-division multiplexed) communication system. Some described embodiments are expected to be relatively robust to manufacturing variation by providing a quasi-static adjustment of the resonant frequency of each ring resonator to compensate for such variation. Some described embodiments may be formed on common and inexpensive semiconductor substrates, e.g. silicon wafers, using processing tools commonly used in semiconductor processing. Thus some embodiments are expected to be manufacturable for a lower cost than similar systems using other architectures, such as those using MZIs (March-Zehnder Interferometers).

Silicon has a relatively weak electro-optic response as compared to $LiNbO_3$ and III-V semiconductors. This small response poses a significant challenge to using Si-based modulators employing a low-voltage silicon MZI. However, the inventor has realized that the electro-optic response of silicon may be sufficient for realization of effective and cost-effective optical modulators based on microcavity resonators. Moreover, low-voltage silicon modulators have the potential to significantly reduce the power consumption of some integrated photonic devices.

Figure 1:
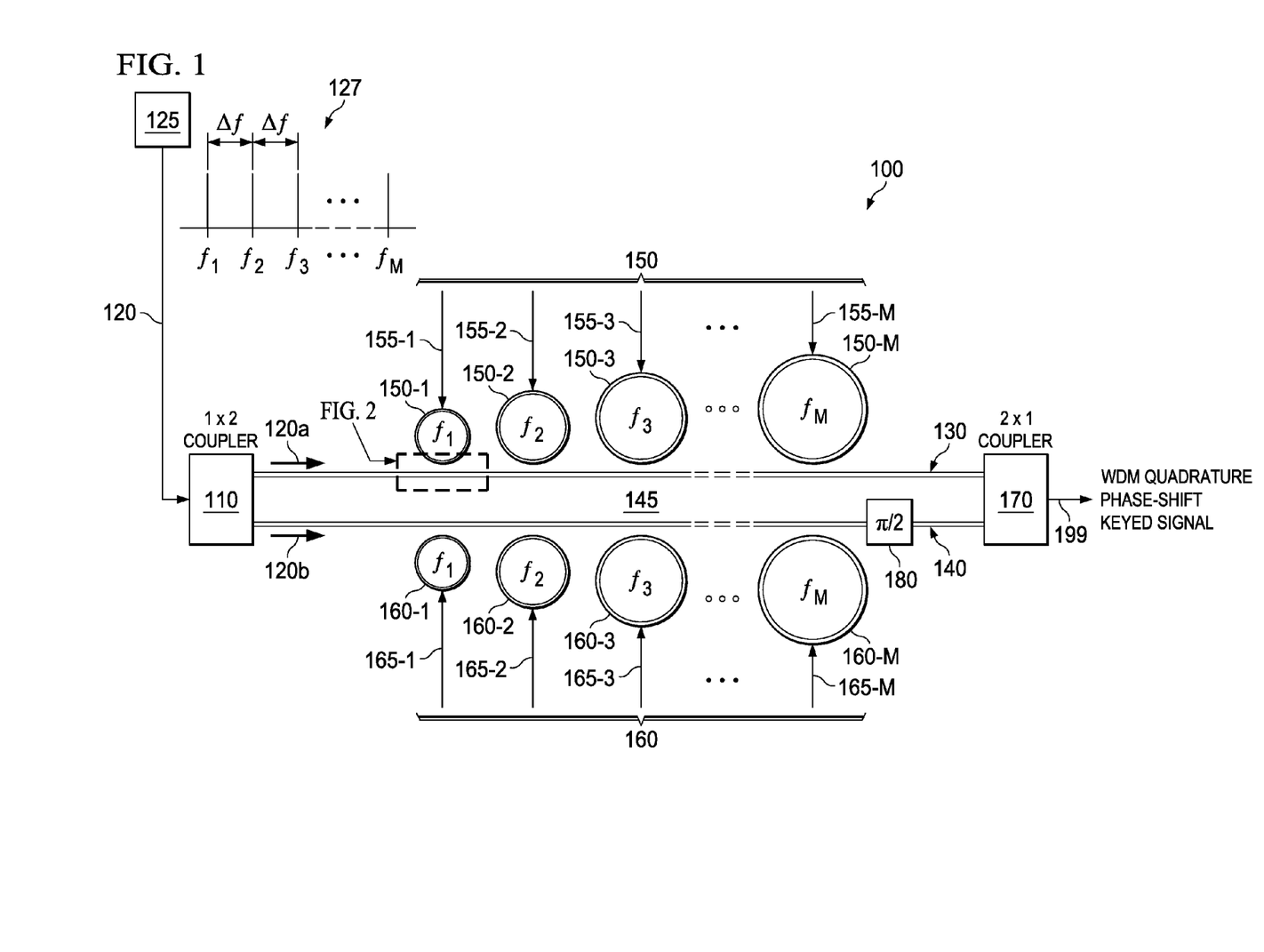
FIG. 1 illustrates an embodiment of the invention in which an optical system, e.g. a quadrature phase-shift keyed (QPSK) modulator, is implemented using a splitter, a combiner, a pair of two optical waveguides coupling the outputs of the splitter to the inputs of the combiner, and a plurality of pairs of optical microcavity resonators, e.g. ring resonators.

Turning to FIG. 1, an apparatus 100 is illustrated according to one embodiment, e.g. a WDM QPSK modulator. A 1×2 coupler 110 receives an optical carrier signal 120 to be modulated, e.g. an unmodulated (CW) laser output having a plurality of WDM channel wavelengths $\lambda_1, \lambda_2, \lambda_3, \ldots \lambda_m$, or equivalently a plurality of WDM channel frequencies $f_1, f_2, f_3, \ldots f_m$. In some embodiments the carrier signal 120 may already be modulated in a manner that is not incompatible with additional modulation applied by the apparatus 100. For example, the carrier signal 120 may also include a frequency that is not a member of the set $\{f_1, f_2, f_3, \ldots f_m\}$ that has previously been modulated to transmit data.

An optical source 125 may produce the carrier signal 120. The optical source 125 may include optical component(s), such as for example lasers and combiners, to produce the carrier signal 120. In some embodiments the optical source 125 produces a frequency comb such as exemplified by a comb 127 with signal components at channel frequencies $f_1, f_2, f_3, \ldots f_m$. The frequencies are not limited to any particular values, and may be in any wavelength band used in optical communications, e.g. in the S band (1460 nm-1530 nm), the C band (1530 nm-1565 nm) or the L band (1565 nm-1625 nm). Furthermore, the frequency components of the comb 127 may be spaced by a WDM grid spacing $\Delta f$, e.g. a regular, about even spacing of the frequency components by a same frequency difference, e.g. about 100 GHz.

The coupler 110 may, e.g., split the carrier signal 120 about equally in power, directing a first carrier portion 120a to a first optical waveguide 130, e.g. a planar or ridge waveguide. The coupler 110 directs a second carrier portion 120b to a second optical waveguide 140, e.g. a planar or ridge waveguide. The core regions of the optical waveguides 130 and 140 are surrounded by a cladding 145 that may include, e.g., an underlying dielectric material and/or an overlying dielectric material and/or air. In some embodiments a phase shifter 180 has a portion located in the optical path of the optical waveguide 140. In the illustrated embodiment the phase shifter 180 is configured to impose a net phase shift on the carrier portion 120b of about $\pi/2$, e.g., $\pi/2 \pm 20\%$ or more generally ($\pi/2 \pm 10\%$)+$n\pi$, wherein n=0, 1, 2 . . . . An optical combiner 170 receives the first and second signal portions from the optical waveguides 130 and 140 and combines these signal portions into an output signal 199.

The apparatus 100 includes a first set 150 and a second set 160 of microcavity resonators, e.g. ring resonators. For convenience the first and second sets 150 and 160 may be respectively referred to as ring resonators 150 and ring resonators 160, and a single ring resonator may be referred to a ring resonator 150 or 160 when further differentiation is not needed. The ring resonators 150 and 160 each resonate at one of a series of resonant frequencies separated by the free spectral range (FSR) of that ring resonator. The resonant frequencies of a particular ring resonator may be determined from the optical properties of the ring core and cladding materials, and the geometry of the particular ring. In various embodiments the frequency range of light of the carrier signal 120 is typically constrained to be within one FSR period of the ring resonator having the smallest FSR. The FSR is typically inversely proportional to the optical path length of the ring resonator, so a smaller ring diameter will result in a larger FSR of the ring resonators 150 and 160, easing the constraint on the carrier signal 120 frequency range. Thus, the frequency range of the carrier signal 120 may typically include only a single resonant frequency of each of the ring resonators 150, 160. This single resonant frequency may be referred to herein generally as $f_r$. The first set 150 includes ring resonators 150-1, 150-2, 150-3, . . . 150-M having corresponding resonant frequencies near $f_1, f_2, f_3, \ldots f_m$. The second set 160 includes ring resonators 160-1, 160-2, 160-3, . . . 160-M also having corresponding resonant frequencies near $f_1, f_2, f_3, \ldots f_m$. By "near", it is meant that the $f_r$ of each of the ring resonators 150 and 160 may be controlled as described below within a narrow range, which includes a corresponding WDM channel frequency, e.g. one of $f_1, f_2, \ldots f_m$. The range may be, e.g. less than about the grid spacing $\Delta f$. In some embodiments, the range may be no greater than about 10% of $\Delta f$.

In some embodiments the ring resonators 150 and 160 are organized as ring resonator pairs, as illustrated, such that a pair includes a ring resonator from each of the sets 150 and 160 having about a same resonant wavelength and about aligned to an axis normal to the waveguides 130 and 140. However, embodiments are not limited to such pairing. In the illustrated embodiment a first pair includes the ring resonator 150-1 and the ring-resonator 160-1 having a resonant frequency near $f_1$. A second pair includes the ring resonator 150-2 and the ring-resonator 160-2 having a resonant frequency near $f_2$. A third pair includes the ring resonator 150-3 and the ring-resonator 160-3 having a resonant frequency near $f_3$. An M-th pair includes the ring resonator 150-M and ring resonator 160-M having a resonant frequency near $f_m$. Embodiments are not limited to any particular number of ring resonators in the first and second ring resonator sets 150 and 160. Furthermore, one or both of the sets 150 and 160 may include one or more ring resonators that are not matched by a ring resonator having a same resonant frequency in the other of the sets 150, 160.

Figure 2:
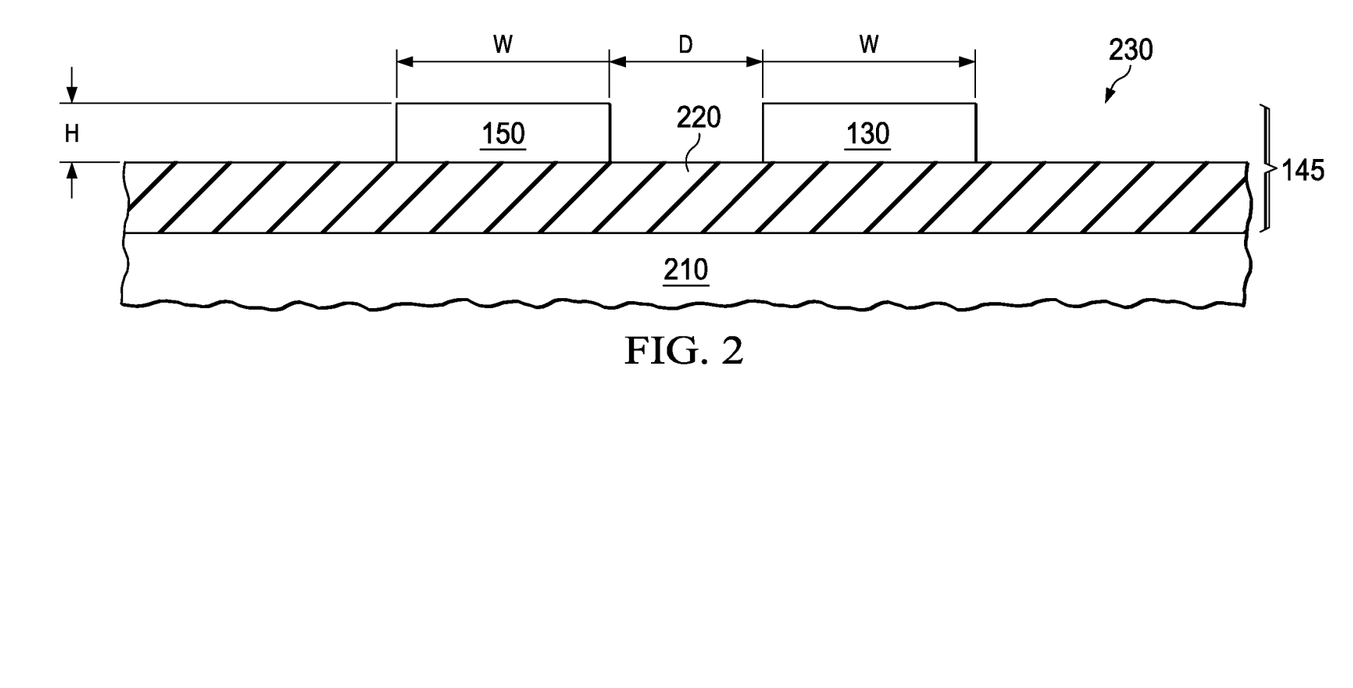
FIG. 2 illustrates a sectional view of an optical path of FIG. 1 and a proximate ring resonator, according to one embodiment of the optical system.

FIG. 2 schematically illustrates a sectional view of the core of the waveguide 130 and a representative ring resonator 150. For later reference, the core of the waveguide 130 and a segment of the optical core of the ring resonator 150 are shown as being separated by a lateral distance D. The waveguide 130 and the ring resonator 150 each have a width W and a height H. While the core of the waveguide 130 and the segment of the optical core of the ring resonator 150 are shown each having the same width, embodiments are not limited to such cases. The cores of the waveguide 130 and the ring resonator 150 may be formed from a semiconductor, e.g. silicon, over a substrate 210, e.g. a silicon wafer. The cladding 145 may include a dielectric layer 220 located between the substrate 210 and the waveguide 130, and between the substrate 210 and the waveguide ring resonator 150. The cladding 145 may also include a dielectric 230 overlying the dielectric layer 220. The dielectric layer 220 and the dielectric 230 serve as the cladding for the waveguide 130 and the ring resonator 150-1 such that optical signals are substantially confined in and guided by these structures.

A convenient platform on which to form the apparatus 100 is a silicon-on-insulator (SOI) wafer, but embodiments of the invention are not limited thereto. For example, a CVD dielectric layer, e.g. plasma oxide, could be formed on any suitable substrate, and a silicon layer could be formed thereover by any suitable method. Other embodiments may use a substrate formed from, e.g. glass, sapphire or a compound semiconductor. The dielectric 230 may be a suitable dielectric material, e.g. silicon oxide, silicon nitride, benzocyclobutene (BCB), or air. For the purpose of this disclosure, "air" includes vacuum.

The waveguide 130 and the ring resonator 150 may be formed from any conventional or nonconventional optical material system, e.g. silicon, $LiNbO_3$, a compound semiconductor such as GaAs or InP, or an electro-optic polymer. Some embodiments described herein are implemented in Si as a nonlimiting example. While embodiments within the scope of the invention are not limited to Si, this material provides some benefits relative to other material systems, e.g. relatively low cost and well-developed manufacturing infrastructure.

Referring again to FIG. 1, each of the ring resonators in the set 150 is optically coupled to the waveguide 130. Each of the ring resonators in the set 160 is optically coupled to the waveguide 140. Herein and in the claims, a ring resonator is defined as being optically coupled to a waveguide when that ring resonator is overcoupled or undercoupled to that waveguide, as further described below.

As appreciated by those skilled in the optical component arts, light propagating within the waveguide 130 may couple, e.g., via evanescent coupling to the ring resonators of the set 150, and light propagating within the waveguide 140 may couple to the ring resonators of the set 160, e.g., via the coupling of evanescent light. By such coupling, a portion of the optical energy propagating in the waveguides 130, 140 couples to the ring resonators 150, 160. The degree of coupling is dependent on, among other factors, the wavelength of the propagating light. When the optical path length of the microcavity resonator is an integer multiple of the wavelength of the coupled light, a relative maximum coupling may occur, producing a notch in the passband of the waveguide. As discussed further below, this notch response may be exploited for use in a low-power optical modulator.

Herein a ring resonator and a proximate segment of waveguide, e.g. the adjacent segment of the ring resonator 150 and the waveguide 130, are defined as being critically coupled when the coupling between them is about equal to the round-trip loss in the ring resonator. In this case, $D=D_c$ (FIG. 2). For example, if the round trip loss is about 1 dB, the ring resonator 150 and the waveguide 130 are critically coupled when the coupling therebetween is also about 1 dB. In other words, about a 1 dB portion of an optical signal propagating in the waveguide proximate the ring resonator is transferred to the ring resonator by, e.g. evanescent coupling. When $D<D_c$ the ring resonator and the waveguide are overcoupled, e.g. a greater portion of the signal is coupled from the waveguide to the ring resonator than is lost in one round trip of the coupled signal in the ring resonator. Conversely when $D>D_c$ the ring resonator and the waveguide are undercoupled, e.g. the coupling is less than the round-trip loss in the ring resonator. As further provided below, when D is greater than a maximum coupling distance $D_{max}$, the ring resonator and the waveguide may be regarded as uncoupled.

Figure 3A:
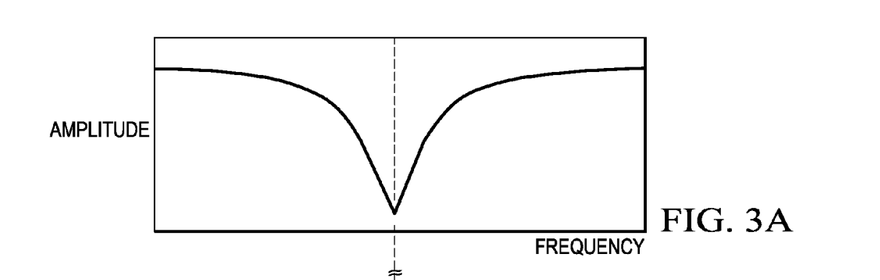
FIG. 3A-3D illustrates example amplitude and phase characteristics of a waveguide coupled to a ring resonator.
Figure 3B:
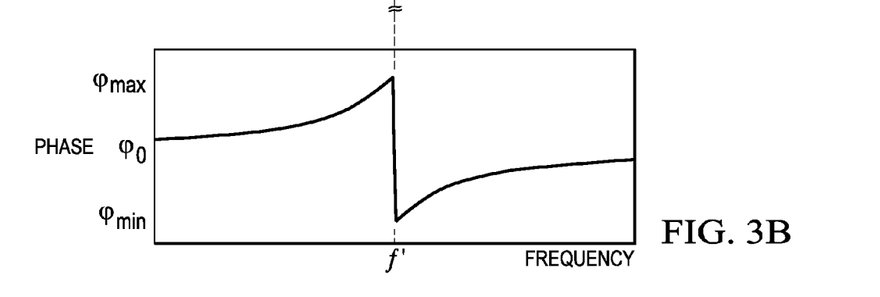
Figure 3C:
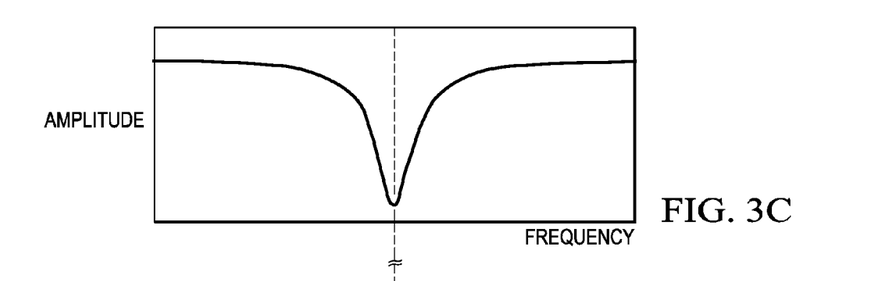
Figure 3D:
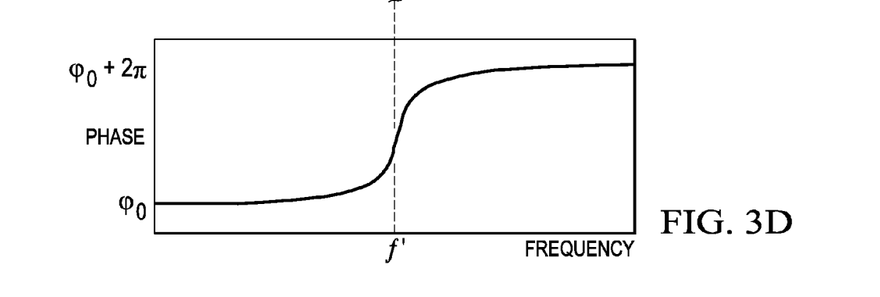

These aspects are illustrated further by FIGS. 3A-3D, in which the resonant frequency of an arbitrary ring resonator is about $f'$. FIGS. 3A and 3B respectively show simplified and nonlimiting amplitude and phase characteristics of a transfer function $g_{uc}(f)$ of a waveguide, e.g. the waveguide 130, coupled to an adjacent segment of a ring resonator, e.g. the ring resonator 150-1, for the case that the waveguide and ring resonator are undercoupled. FIGS. 3C and 3D respectively show simplified and nonlimiting amplitude and phase characteristics of a transfer function $g_{oc}(f)$ of a waveguide, e.g. the waveguide 130, coupled to a ring resonator, e.g. the ring resonator 150-1, for the case that the waveguide and ring resonator are overcoupled.

The amplitude characteristics of the transfer functions $g_{uc}(f)$ and $g_{oc}(f)$ are qualitatively similar, each having a local minimum at $f'$ for both the undercoupled case (FIG. 3A) and the overcoupled case (FIG. 3C). For the undercoupled case the phase of the transfer function $g_{uc}(f)$ (FIG. 3B) increases from $\phi_o$ at $f<<f'$ to a local maximum $\phi_{max}$ at $f'-\delta$ (where $\delta$ is a small value, e.g. no greater than about 5% of $\Delta f$), and from a local minimum $\phi_{min}$ at $f'+\delta$ to $\phi_o$ at $f>>f'$. The phase may have an indeterminant value at about $f'$. For the overcoupled case the phase of the transfer function $g_{oc}(f)$ (FIG. 3D) increases smoothly from an initial value $\phi_{min}=\phi_0$ at $f<<f'$ to a final value of $\phi_{max}=\phi_o+2\pi$ at $f>>f_r$. In both FIGS. 3B and 3D $\phi_o$ is arbitrary, and $\phi_o$ may be different in the two figures.

As discussed further below, when $\phi_{max}-\phi_{min}$ is about $\pi$ radians the coupling between the ring resonator 150 and the waveguide 130 may be exploited to produce BPSK (binary phase-shift keyed) modulation on a signal propagating in the waveguide 130. In the overcoupled case $\phi_{max}-\phi_{min}$ is expected to always meet this condition. In the undercoupled case $\phi_{max}-\phi_{min}$ may be least about $\pi$ when the coupling between the ring resonator and the waveguide is sufficiently strong, e.g. when $D \le D_{max}$.

Accordingly, herein and in the claims an optical waveguide and a microcavity resonator are "optically coupled" when they are overcoupled, critically coupled, or undercoupled. The term "undercoupled" with respect to a ring resonator and a proximate waveguide is defined as meaning that the ring resonator and the waveguide are not overcoupled, but are sufficiently coupled to produce a phase change in the transfer function of the waveguide of at least about $\pi$ radians. A ring resonator whose core segments are distant enough from a waveguide, e.g. $D>D_{max}$ such that any phase change of the transfer function produced by the ring resonator is less than about it radians is considered "uncoupled".

Referring back to FIG. 1, each of the ring resonators of the set 150 may have a different physical path length. The ring resonators are not limited to any particular path shape. For instance, the optical path of the ring resonators may have a circular, elliptical, or "racetrack" shape, though a circular path shape may be preferred to reduce losses in the ring resonator. In the example case of a circular path, the ring resonator 150-1 may have a radius $r_1$, the ring resonator 150-2 may have a radius $r_2>r_1$, the ring resonator 150-3 may have radius $r_3>r_2$ and so on. The radius $r_1$ may be selected such that the ring resonator 150-1 has a physical path length that causes the optical coupling of the waveguide 130 thereto to resonate at about $f_1$. The radius $r_2$ may be selected such that the ring resonator 150-2 has a physical path length that causes the optical coupling of the waveguide 130 thereto to resonate at about $f_2$. The radius $r_3$ may be selected such that the ring resonator 150-3 has a physical path length that causes the optical coupling of the waveguide 130 thereto to resonate at about $f_3$, and so on as illustrated.

Figure 4:
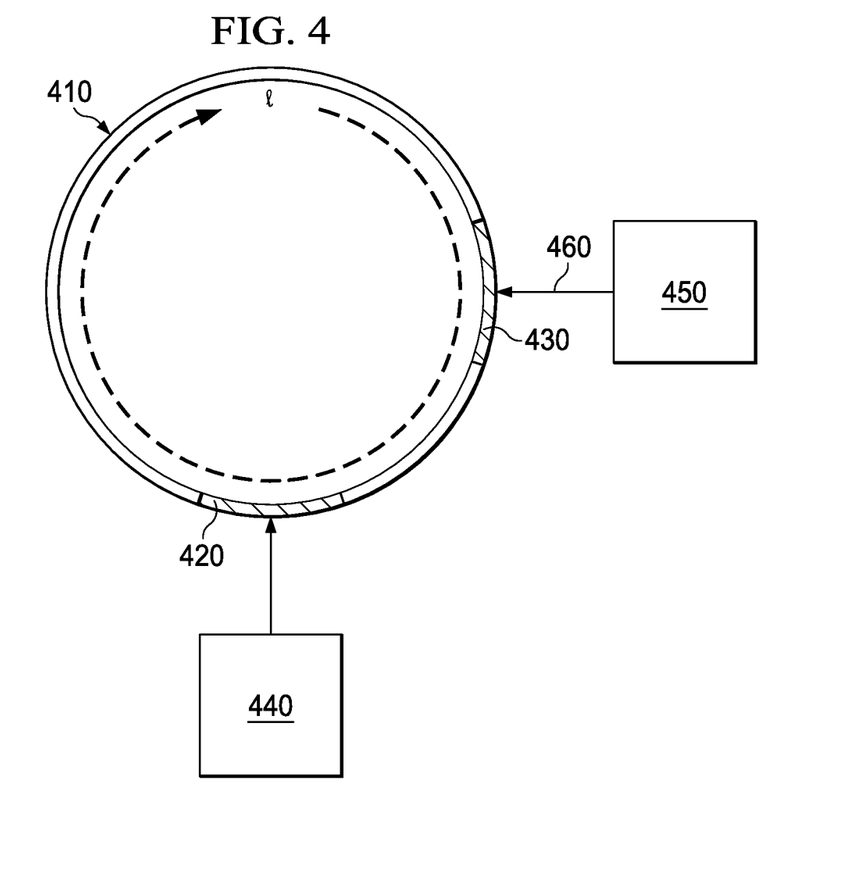
FIG. 4 illustrates a single ring resonator, e.g. one of the ring resonators of FIG. 1, with a quasi-static optical path length adjuster, and a high-speed optical path length adjuster configured to modulate the path length at a rate between one or a few GHz and tens of GHz.

FIG. 4 illustrates a nonlimiting embodiment of a single ring resonator 410 with a resonant frequency $f'$ that may be representative of any of the ring resonators 150, 160. The ring resonator 410 has an optical path length l, and includes two electrically or thermally controllable optical path length adjusters, e.g. phase shifters, 420 and 430. A controller 440 provides an appropriately configured signal to control the electrically or thermally controllable phase shifter 420. A controller 450 provides an appropriately configured signal to control the electrically or thermally controllable phase shifter 430 via a control line 460.

The controllable phase shifter 420 may be configured to provide a quasi-static, e.g. relatively slow, adjustment to the optical path length l, while the adjuster 430 may be configured to provide a relatively fast adjustment of the same optical pathlength l. For example, the controllable phase shifter 420 may be a thermal phase shifter with a response time on the order of one second. Such a slow phase shifter may be useable for the purpose of fine tuning the optical path length l to account for, e.g. a manufacturing or operating temperature variation of the optical path length l. The $f_r$ of each resonator may be tuned to be about equal to one of the WDM channel frequencies $f_1 \ldots f_M$, e.g., by setting such slow phase shifters appropriately. The controllable phase shifter 430 may be an electro-optic phase shifter that is useable for the purpose of rapidly modulating the optical path length between one of two predetermined values. For example, the controller 450 may modulate the optical path length l at a rate between one or a few GHz and tens of GHz to provide for data modulation of an optical carrier. As described further below the modulation may cause the ring resonator 410 to rapidly switch between a resonant frequency of $f_n-\delta$ and $f_n+\delta$, where n=1, 2, 3, ... m to thereby impart data on an optical carrier signal having one of the channel frequencies $f_1, f_2, f^3 \ldots f_m$ wherein the carrier signal is propagating in an adjacent and optically coupled or couplable waveguide.

Referring back to FIG. 1, each of the ring resonators 150-1, 150-2, 150-3 ... 150-M includes a corresponding control line 155-1, 155-2, 155-3, ... 155-M. Similarly each of the ring resonators 160-1, 160-2, 160-3 ... 160-M includes a corresponding control line 165-1, 165-2, 165-3, ... 165-M. Each of the control lines 155 and 165 may be configured to provide a modulation signal to the corresponding ring resonator as described with respect to the control line 460 in FIG. 4.

FIGS. 5A-5E illustrate without limitation cross sections of several examples of ring resonators formed from a semiconductor, e.g. silicon, and configured to have adjustable resonant frequencies. While the embodiments of FIGS. 5A-5E are presented as examples of suitable structures for enabling variable control of the resonant frequency of the ring resonators 150 and 160, embodiments of the invention are not limited to any particular type of resonant frequency control, which may be implemented by any conventional or future-discovered method.

Figure 5A:
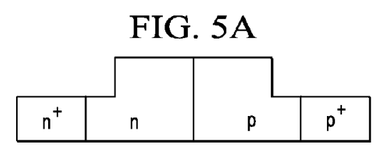
FIGS. 5A-5E illustrate sectional views of various embodiments of the resonator of FIG. 4, showing features that may be used to change the optical path length of the resonator, including electro-optic modulators (FIGS. 5A and 5B) and thermal phase shifters (FIGS. 5C-5E)
Figure 5B:
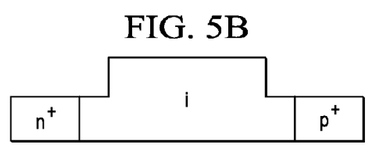

FIGS. 5A and 5B illustrate ring resonators whose resonant frequencies are controllable by electro-optic modulation. These structures may provide high frequency switching, and thus may be suitable for the controllable phase modulator 430. The ring resonator in FIG. 5A includes an optical core region that has n-doped and p-doped portions that form a p-n junction, e.g. a p-n diode. Heavily doped $n^+$ and $p^+$ regions provide electrical contact to the core region. The core regions are constructed so that the refractive index of the semiconductor core is dependent on the electron concentration. The electron concentration may be modulated by applying a variable back-bias on the p-n junction. By changing the refractive index the optical path length of the ring resonator, the ring resonator's resonant frequency is changed. The ring resonator in FIG. 5B includes an optical core region formed from an intrinsic semiconductor. Doped $n^+$ and $p^+$ regions provide electrical contact to the intrinsic region and form a p-i-n diode. As described with respect to FIG. 5A, the resonant frequency of the ring resonator of FIG. 5B may also be modulated by varying the electron density of the intrinsic region through the modulation of a back-bias across the p-i-n diode.

Figure 5C:
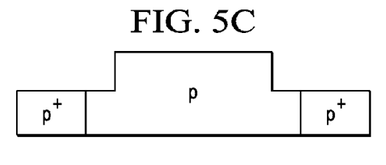
Figure 5D:
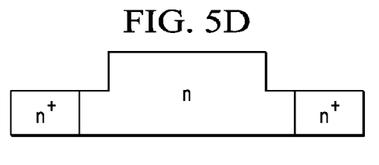
Figure 5E:
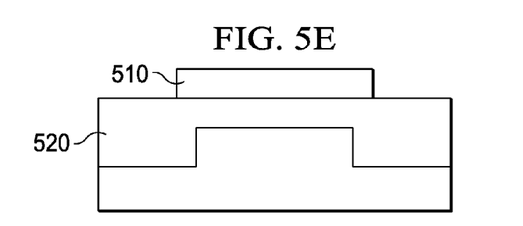

FIGS. 5C-5E illustrate in sectional view embodiments of ring resonators in which the resonant frequencies may be changed by heating the ring-like waveguide core therein. These structures provide relatively slow optical path length adjustments, and thus may be suitable for the controllable phase shifter 420. In FIG. 5C the core region of the ring resonator's waveguide is formed from a p-type semiconductor, and heavily doped $p^+$ regions provide electrical contact to the core region. FIG. 5D illustrates a similar embodiment in which the core region is formed from an n-type semiconductor and heavily doped $n^+$ regions provide electrical contact to the core. In each of these embodiments the waveguide of the ring resonator, or a segment thereof, may be heated by passing current through the core region via the heavily doped regions. In response, resistive heating will warm the ring resonator, which changes the refractive index thereof by the thermo-optic effect, thereby changing the resonant frequency. FIG. 5E shows another embodiment that relies on heating, but for this embodiment, the heating is provided by a resistive heater element 510 formed over a cladding layer 520. Those skilled in the art are familiar with forming resistive heater elements.

Figure 6A:
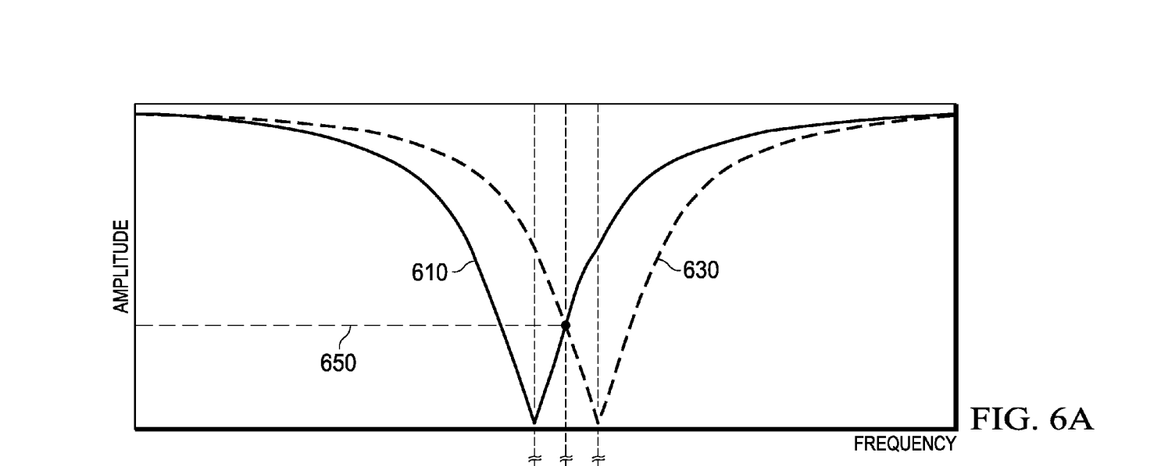
FIGS. 6A, 6B, 7A and 7B illustrate amplitude and phase characteristics of, e.g. one of the waveguides of FIG. 1 with an undercoupled ring resonator (FIGS. 6A and 6B) and an overcoupled ring resonator (FIGS. 7A and 7B)
Figure 6B:
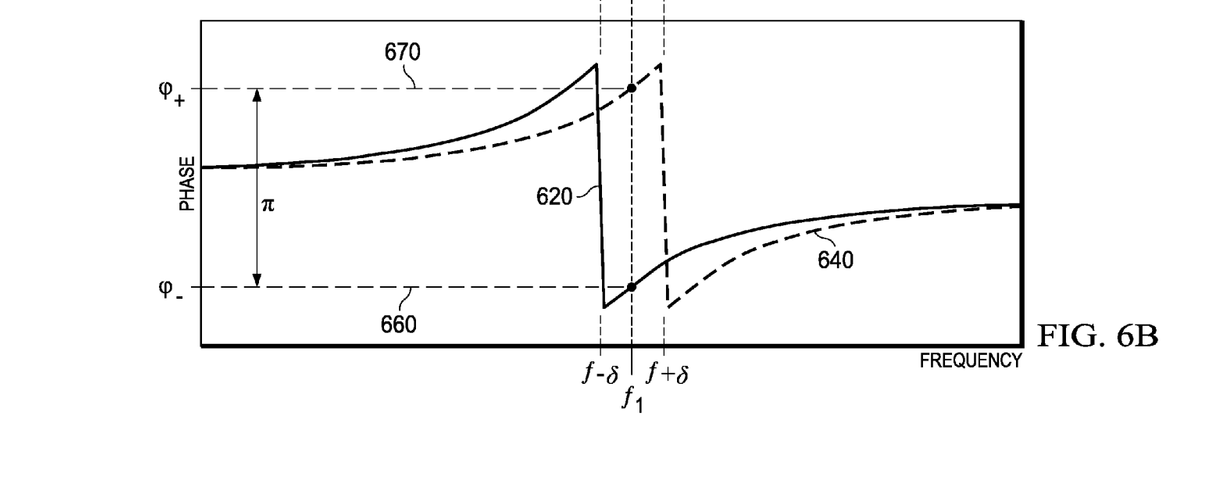

Now considering FIGS. 6A and 6B, illustrated are amplitude and phase characteristics of the transfer function of a waveguide, e.g. the waveguide 130, which is undercoupled to a ring resonator, e.g. the ring resonator 150-1. The following discussion is presented with reference to the ring resonator 150-1. Based on this description, it will be immediately apparent to those skilled in the art that the described principles also may be applied to the other ring resonators. The ring resonator 150-1 is configured to switch between a resonant frequency of $f_1-\delta$ and $f_1+\delta$ in response to application of control signals thereto. For the ring resonator 150-1, an amplitude characteristic 610 and a phase characteristic 620 are associated with the lower resonant frequency at $f_1-\delta$ (i.e., indicated as $f^-$), and a different amplitude characteristic 630 and a different phase characteristic 640 are associated with the higher resonant frequency at $\theta_1+\delta$ (i.e., indicated as $f_+$).

Considering first the case in which the resonant frequency of the ring resonator is $f_1-\delta$, when the optical signal portion 120a having a frequency of $f_1$ propagates within the waveguide 130, the signal is attenuated by the amplitude characteristic 610 to a value 650. The frequency of the optical signal is considered to correspond to the resonant frequency of the ring resonator by virtue of being about equal to the frequency at which the amplitude characteristics 610 and 630 intersect, e.g. $f_1$. The phase of the signal is shifted by the phase characteristic 620 to a value 660 indicated as $\phi_-$. Now when the resonant frequency of the ring resonator is $f_1+\delta$, the signal is again attenuated by the amplitude characteristic 630 to about the same value 650. However, the phase of the signal is shifted to a value 670 indicated as $\phi_+$ by the phase characteristic 640. The size of $\delta$ can be set such that the relative phase shift $\phi_- - \phi_+$ is about $\pi$ radians. Thus the propagating signal may be BPSK modulated by controllably switching the resonant frequency of the ring resonator between $f_1-\delta$ and $f_1+\delta$.

Figure 7A:
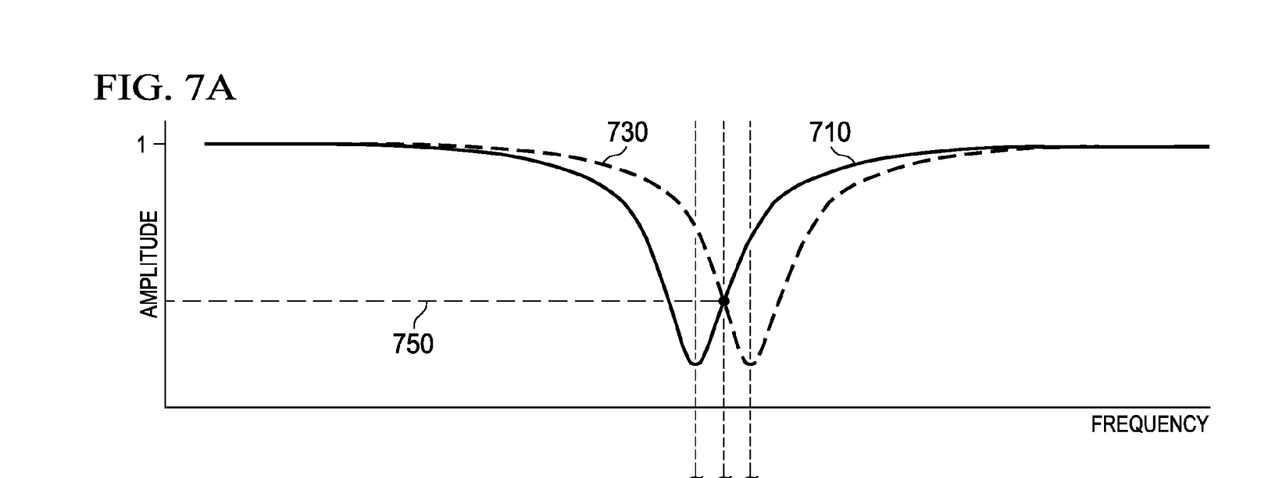
Figure 7B:
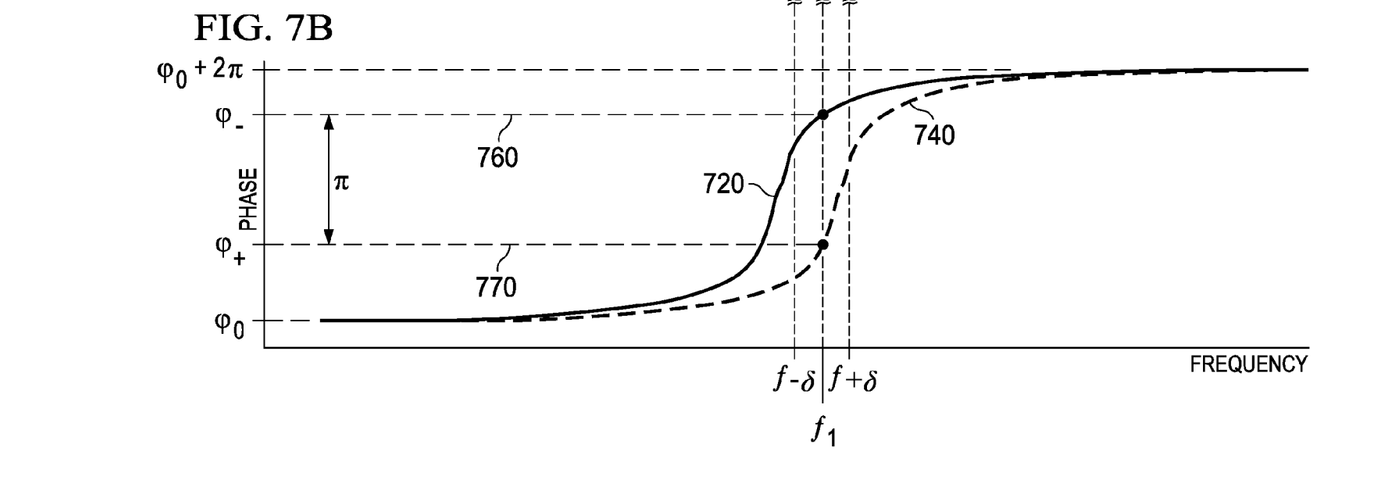

FIGS. 7A and 7B illustrate amplitude and phase characteristics for an example case in which a waveguide, e.g. the waveguide 130, is overcoupled to a controllable ring resonator, e.g. the ring resonator 150-1 during two different modulation states thereof. An amplitude characteristic 710 and a phase characteristic 720 respectively describe the amplitude reduction and phase shift produced by the coupling between the ring resonator and the waveguide when the resonant frequency $f_r$ of the ring resonator 150-1 is $f_1-\delta$ (i.e., indicated as $f_-$). An amplitude characteristic 730 and a phase characteristic 740 respectively describe the amplitude reduction and phase shift produced by the coupling between the ring resonator and the waveguide when $f_r=f_1+\delta$ (i.e., indicated as $f_+$). For both the amplitude characteristics 710 and 730 the propagated signal amplitude is reduced to a value 750 at the carrier frequency $f_1$. For the case that $f_r=f_1-\delta$, the phase shift of an optical carrier, at the frequency $f_1$, is shown by the phase characteristic 720 as being $\phi_-$ at reference 760. For the case that $f_r=f_1+\delta$, the phase shift of an optical carrier, at the frequency $f_1$, is shown by the phase characteristic 740 as $\phi_{max}$ at reference 770. As described previously, the value of $\delta$ may be selected such that the relative phase shift $\phi_- - \phi_+$ for the two different modulation states is about $\pi$ radians. Thus, the optical carrier signal at carrier frequency $f_1$ and propagating in the waveguide 130 may be BPSK modulated by such an operation on an over coupled ring resonator.

Figure 8A:
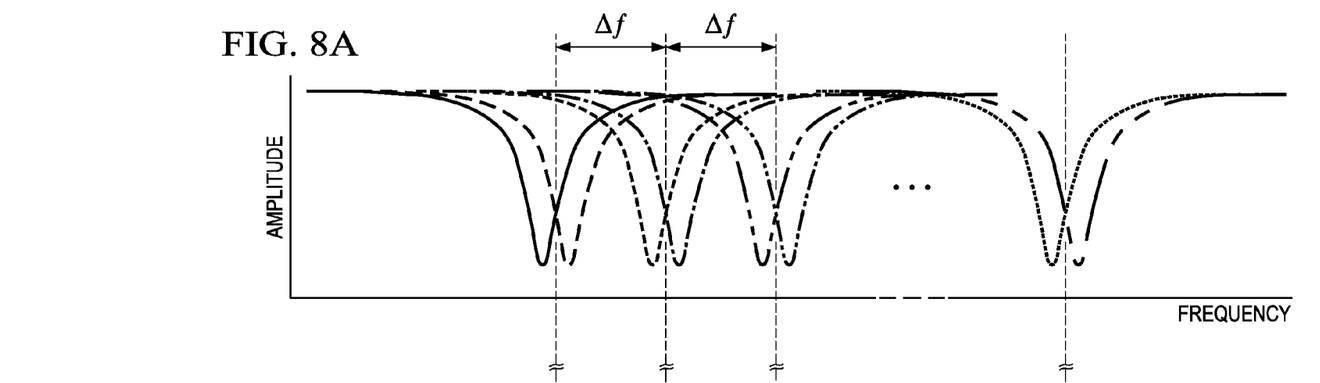
FIGS. 8A and 8B respectively illustrate amplitude and phase response of four transfer characteristics associated with a waveguide coupled to four ring resonators in FIG. 1, wherein each ring resonator is controllable to have one of two predetermined resonant frequencies, above and below a WDM channel frequency.
Figure 8B:
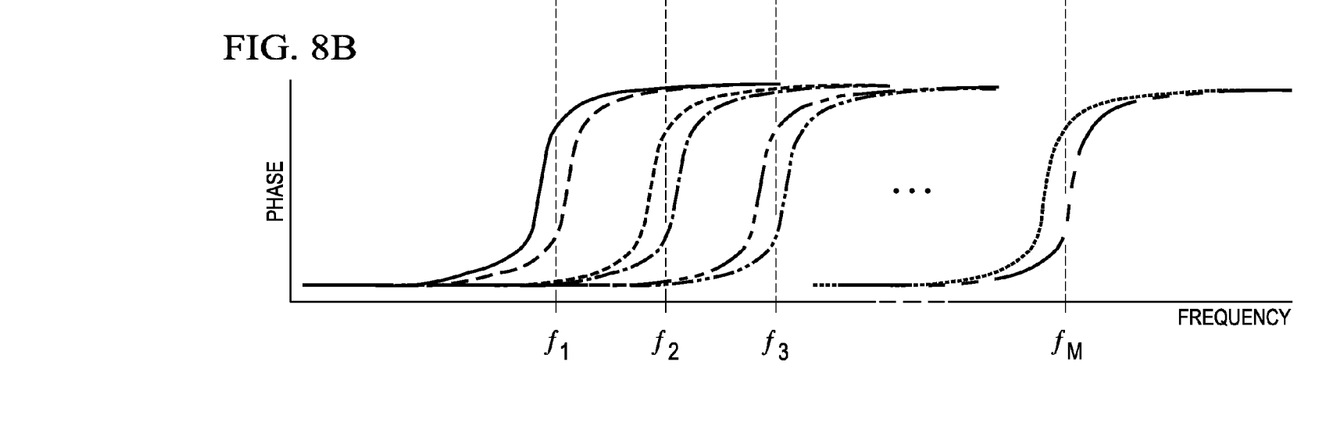

FIGS. 8A and 8B respectively schematically illustrate attenuation and phase characteristics of a waveguide, e.g. the waveguide 130, when overcoupled to a plurality of ring resonators, e.g. the ring resonators 150-1, 150-2, 150-3, . . . 150-M. The waveguide may transmit optical carriers propagating at a plurality of frequencies, e.g. $f_1, f_2, f_3, \ldots f_M$, as produced by the optical source 125, e.g., a WDM multichannel optical source or a wavelength tunable optical source. By appropriately switching the modulation states of the ring resonators 150, any signal component of the optical carrier portion 120a at $f_1, f_2, f_3, \ldots f_M$ may be independently BPSK modulated with a series of ring resonators whose coupling characteristics to the waveguide 130 are as shown in FIGS. 8A-8B. Similarly, by appropriately modulating the states of the series of ring resonators 160 any signal component of the carrier portion 120b at $f_1, f_2, f_3, \ldots \theta_M$ may be BPSK modulated.

Recalling FIG. 1, the phase shifter 180 in line with or coupled to the waveguide 140 (FIG. 1) may apply about a relative $\pi/2$ phase shift to the carrier portion 120b. Then, when the combiner 170 recombines the carrier portions 120a and 120b, a QPSK modulated output signal 199 will result such that the waveguide 130 and the waveguide 140 produce the respective in-phase and quadrature components of the QPSK modulated output signal 199. Because the ring resonators 150 and 160 may independently modulate multiple wavelength components of the carrier signal 120, the apparatus 100 provides the ability to perform WDM QPSK. Implementations of the apparatus 100 may be very compact, e.g., integrated optical devices, thereby providing, in some embodiments, small and low-cost WDM QPSK optical modulators.

Figure 9A:
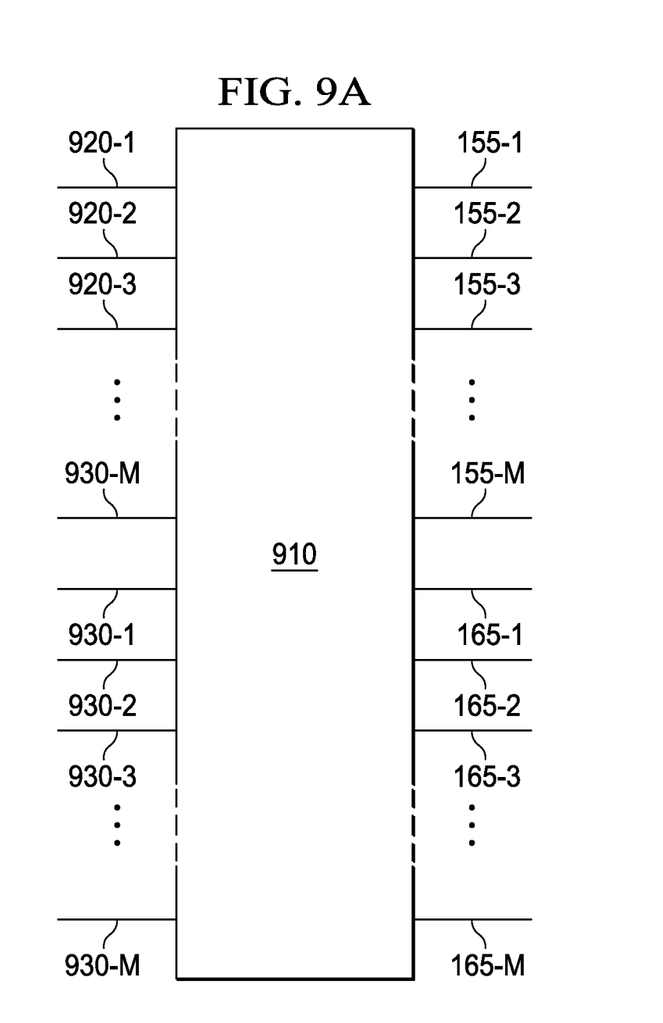
FIGS. 9A and 9B illustrate embodiments of a controller configured to control the resonant frequencies of the ring resonators of FIG. 1 to modulate a carrier signal.
Figure 9B:
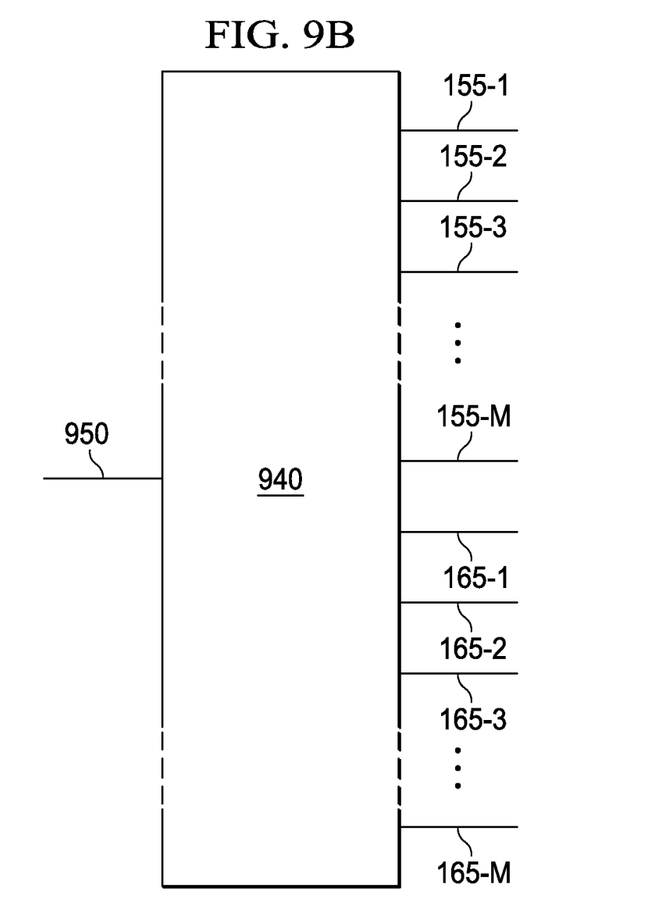

FIGS. 9A and 9B illustrate two representative and nonlimiting embodiments of electrical modules for mapping input data to the control lines 155-1, 155-2, 155-3, . . . 155-M and 165-1, 165-2, 165-3, . . . 165-M as shown in FIG. 1. FIG. 9A illustrates an electrical switching module 910. The switching module 910 is configured to receive data streams at inputs 920-1, 920-2, 920-3 . . . 920-M for corresponding ones of the control lines 155-1, 155-2, 155-3, . . . 155-M. The switching module 910 is further configured to receive data at inputs 930-1, 930-2, 930-3 . . . 930-M for corresponding ones of the control lines 165-1, 165-2, 165-3, . . . 165-M. The electrical switching module 910 is controllable to permute the mapping data streams at the inputs 920-1-920-M and 930-1-930-M onto the set of control lines 155-1-155-M and 165-1-165-M. For that reason, the switching module 910 enables different mappings of received WDM data streams onto the channels modulated by the apparatus 100 of FIG. 1. FIG. 9B illustrates an electrical power-splitter module 940 configured to receive a single electrical modulation signal at input 950 and to power split the signal to produce therefrom individual electrical control signals for each of the control lines 155-1, 155-2, 155-3, . . . 155-M, and each of the control lines 165-1, 165-2, 165-3, . . . 165-M.

With the switching module 910, each of the ring resonators 150 and 160 may be treated as a modulator for a single frequency channel that may be modulated independently of the other frequency channels of a WDM optical carrier. The module 910 enables rearrangements of the separate data streams over the set of optical modulation channels. With the module 940, a data stream received via the input 950 may be power-divided between the control lines 155 and 165 to modulate the ring resonators 150 and 160 in a coordinated fashion to transmit the received data stream. Those skilled in the art will appreciate that the ring resonators 150 and 160 may be operated by modules such as the modules 910, 940 and variants thereof to provide various combinations of independent and coordinated modulation to transmit data. Each of the modules 910 and 940 may include any combination of electronic components as needed to implement the desired mapping of the received data to the control outputs. The type of electrical output may correspond to the type of control signal appropriate to the modulation structure of the ring resonators 150, 160, e.g. as illustrated in FIG. 4.

Figure 10:
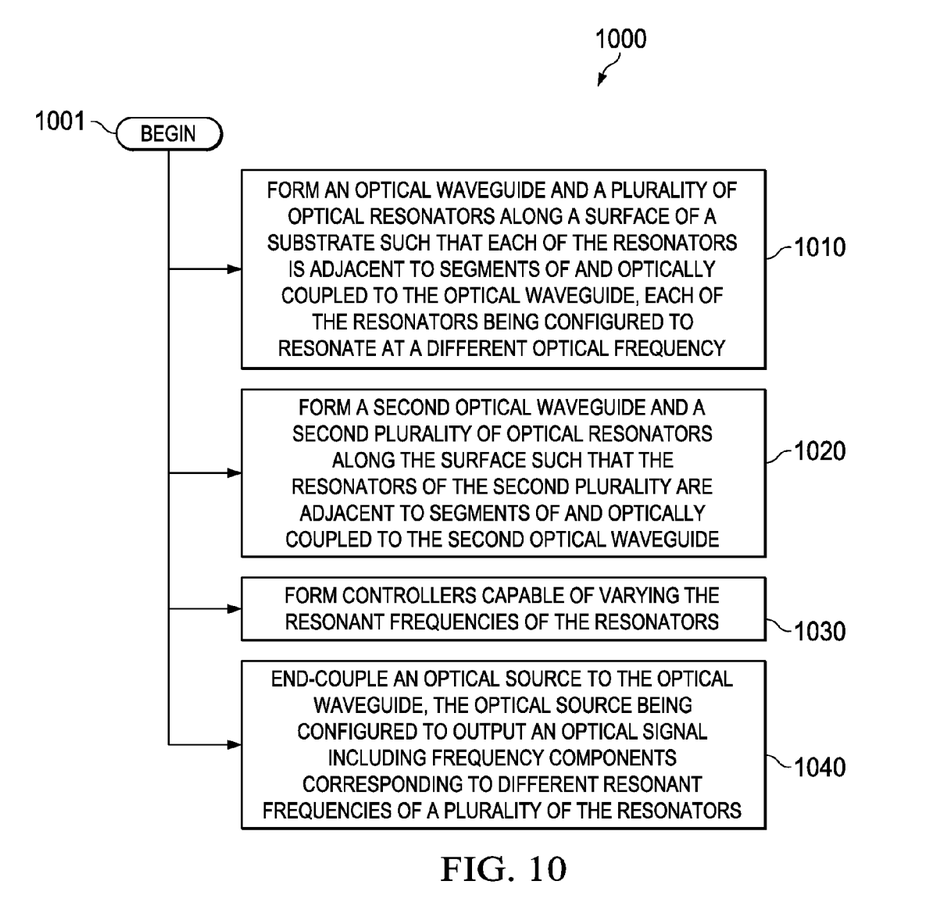
FIG. 10 presents a method, e.g. for manufacturing an optical system such as described by various embodiments herein, e.g.

Turning now to FIG. 10, a method 1000 is described, e.g. for forming an optical device according to various embodiments. The steps of the method 1000 are described without limitation by reference to elements previously described herein, e.g. in FIGS. 1-9. The steps of the method 1000 may be performed in another order than the illustrated order, and in some embodiments may be omitted altogether and/or performed concurrently or in parallel groups. The method 1000 is illustrated without limitation with the steps thereof being performed in parallel fashion, such as by concurrent processing on a common substrate. Other embodiments, e.g. those utilizing multiple substrates, may perform the steps partially or completely sequentially and in any order.

The method 1000 begins with an entry 1001. In a step 1010 an optical waveguide, e.g. the waveguide 130, and a plurality of optical resonators, e.g. the resonators 150, are formed along a surface of a substrate. The forming is performed such that each of the resonators is adjacent to segments of and optically coupled to the optical waveguide. Each of the resonators is configured to resonate at a different optical frequency.

Some embodiments of the method 100 include a step 1020 in which a second optical waveguide is formed, e.g. the waveguide 140, and a second plurality of optical resonators is formed, e.g. the resonators 160, along the surface. The resonators of the second plurality are adjacent to segments of and optically coupled to the second optical waveguide. Each resonator of the second plurality is configured to resonate at about an optical resonant frequency of a corresponding one of the resonators of the first plurality.

Some embodiments of the method 1000 include a step 1030 in which controllers are formed, e.g. the controllers 440 and 450. The controllers are capable of varying the resonant frequencies of the resonators. Some embodiments of the method 1000 include a step 1040 in which an optical source, e.g. the optical source 125, is end-coupled to the optical waveguide. The optical source is configured to output an optical signal including frequency components corresponding to different resonant frequencies of a plurality of the resonators.

In any embodiment of the method 1000 the forming may include making an optical power splitter, e.g. the splitter 110. The splitter has first and second outputs connected to ends of corresponding ones of the optical waveguides. In any such embodiment the first and second pluralities of optical resonators may be operable to WDM QPSK modulate an optical carrier received by the optical power splitter.

In any embodiment of the method 1000, the forming may include making an optical combiner, e.g. the combiner 170. The combiner has first and second inputs connected to ends of corresponding ones of the optical waveguides. In any embodiment, some of the resonators may be overcoupled to the optical waveguide. In any embodiment optical core regions of the optical waveguide and the resonators may be formed silicon regions located over a dielectric layer. In any embodiment each resonator may include a first optical phase shifter configured to enable quasi-static optical path adjustments of the each resonator, and may include a second optical phase shifter capable of varying optical pathlengths at frequencies of 1 GHz or more.

Those skilled in the art to which this application relates will appreciate that other and further additions, deletions, substitutions and modifications may be made to the described embodiments.

What is claimed is:

1. A system comprising:
 a substrate with a planar surface;
 a first optical waveguide located along the surface;
 a first plurality of optical resonators located along the surface and optically coupled to said optical waveguide, each of said optical resonators being configured to resonantly couple to the optical waveguide at a different optical frequency;
 a second optical waveguide;
 a second plurality of optical resonators optically coupled to said second optical waveguide, wherein each optical resonator of said second plurality is configured to resonantly couple to the second optical waveguide at about a same optical frequency as a corresponding one of the optical resonators of said first plurality; and
 an optical combiner having first and second inputs connected to ends of corresponding ones of the first optical waveguide and the second optical waveguide.

2. The system of claim 1, wherein the second optical waveguide is located along the surface.

3. The system of claim 1, wherein said first optical waveguide end-connects a first output of an optical power splitter to a first input of the optical power combiner and the second optical waveguide end-connects a second output of the optical power splitter to a second input of the optical power combiner.

4. The system of claim 1, wherein the first and second optical waveguides and the optical resonators are configured to QPSK optically modulate optical carriers at a sequence of wavelengths.

5. The system of claim 1, wherein some of said optical resonators are overcoupled to at least one of said first or second optical waveguides.

6. The system of claim 1, wherein optical core regions of said first optical waveguide and said second optical waveguide and said optical resonators are formed in silicon located over a dielectric layer.

7. The system of claim 1, further comprising an optical source configured to output said optical signal such that said optical signal including frequency components corresponding to resonant frequencies of said optical resonators.

8. A system comprising:
 a substrate with a planar surface;
 an optical waveguide located along the surface; and
 a plurality of optical resonators located along the surface and optically coupled to said optical waveguide, each of said optical resonators being configured to resonantly couple to the optical waveguide at a different optical frequency, wherein each optical resonator includes a first optical phase modulator configured to enable quasi-static optical path adjustments thereto and a second optical phase modulator configured to enable optical path adjustments at a frequency of at least about 1 GHz.

9. The system of claim 8, further including:
 a second optical waveguide located along the substrate; and
 a second plurality of optical resonators optically coupled to said second optical waveguide, wherein each optical resonator of said second plurality is configured to resonantly couple to the second optical waveguide at about a same optical frequency as a corresponding one of the optical resonators of said first plurality.

10. The system of claim 9, further including:
 an optical combiner having first and second inputs connected to ends of corresponding ones of the optical waveguide and the second optical waveguide.

11. A method comprising:
 forming a first optical waveguide and a plurality of optical resonators along a surface of a substrate such that each of said resonators is adjacent to segments of and optically coupled to said optical waveguide, each of said resonators being configured to resonate at a different optical frequency;
 forming a second optical waveguide and a second plurality of optical resonators along said surface such that the resonators of said second plurality are adjacent to segments of and optically coupled to said second optical waveguide, wherein each resonator of the second plurality is configured to resonate at about an optical resonant frequency of a corresponding one of the resonators of said first plurality; and
 making an optical combiner having first and second inputs connected to ends of corresponding ones of the first optical waveguide and the second optical waveguide.

12. The method of claim 11, the forming includes making an optical power splitter having first and second outputs connected to ends of corresponding ones of the first optical waveguide and the second optical waveguide.

13. The method of claim 12, wherein said first and second pluralities of optical resonators are operable to WDM QPSK modulate an optical carrier received by the optical power splitter.

14. The method of claim 11, wherein some of said optical resonators are overcoupled to at least one of said first or second optical waveguides.

15. The method of claim 11, further comprising forming controllers capable of varying the resonant frequencies of the optical resonators.

16. The method of claim 11, wherein optical core regions of said first optical waveguide and said second optical waveguide and said optical resonators are formed in silicon regions located over a dielectric layer.

17. The method of claim 11, further comprising end-coupling an optical source to said optical waveguide, the optical source being configured to output an optical signal including frequency components corresponding to different resonant frequencies of a plurality of said resonators.

18. A method comprising:
forming an optical waveguide and a plurality of optical resonators along a surface of a substrate such that each of said resonators is adjacent to segments of and optically coupled to said optical waveguide, each of said resonators being configured to resonate at a different optical frequency, wherein each resonator includes a first optical phase shifter configured to enable quasi-static optical path adjustments of the each resonator and includes a second optical phase shifter capable of varying optical pathlengths at frequencies of about 1 GHz or more.

19. The method of claim 18, further including:
forming a second optical waveguide and a second plurality of optical resonators along said surface such that the resonators of said second plurality are adjacent to segments of and optically coupled to said second optical waveguide, wherein each resonator of the second plurality is configured to resonate at about an optical resonant frequency of a corresponding one of the resonators of said first plurality.

20. The method of claim 19, further including:
making an optical combiner having first and second inputs connected to ends of corresponding ones of the optical waveguide and the second optical waveguide.

* * * * *